(12) United States Patent
Sharp et al.

(10) Patent No.: US 7,630,715 B2
(45) Date of Patent: Dec. 8, 2009

(54) COMMUNICATION SYSTEM, METHODS OF MANAGING A COMMUNICATION SYSTEM AND MOBILE USER EQUIPMENT

(75) Inventors: Andrew Sharp, Lidingö (SE); Martin Stümpert, Hochspeyer (DE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 0 days.

(21) Appl. No.: 12/186,816

(22) Filed: Aug. 6, 2008

(65) Prior Publication Data
US 2008/0305800 A1 Dec. 11, 2008

Related U.S. Application Data

(63) Continuation of application No. 09/493,487, filed on Jan. 28, 2000, now abandoned.

(30) Foreign Application Priority Data
Jan. 31, 1999 (EP) .................................. 99101948

(51) Int. Cl.
*H04W 36/00* (2009.01)
(52) U.S. Cl. .................................... 455/436; 455/435.1
(58) Field of Classification Search .............. 455/432.1, 455/436, 435.2, 435.3, 435.1
See application file for complete search history.

(56) References Cited

U.S. PATENT DOCUMENTS 6,377,804 B1 * 4/2002 Lintulampi .............. 455/435.2
2001/0046863 A1 * 11/2001 Rinne et al. ................. 455/442

OTHER PUBLICATIONS

Naghshineh M et al: "End-To-End QOS Provisioning in Multimedia Wireless/Mobile Networks Using an Adaptive Framework" IEEE Communications Magazine, vol. 35, No. 11. Nov. 1, 1997, pp. 72-81.

* cited by examiner

*Primary Examiner*—Tu X Nguyen

(57) ABSTRACT

An apparatus and a method in a communication system with at least two different access systems, wherein a first access system is capable of handling a first number of communications between a mobile user equipment (MUE) and the first access system and wherein a second access system is capable of handling a second number of communications between the mobile user equipment (MUE) and the second access system. The communication system contains at least one means for making at least one decision, which communication or communications are handed over in the case that the mobile user equipment (MUE) moves between the first access system and the second access system and at least one means for executing the at least one decision.

24 Claims, 11 Drawing Sheets

COMMUNICATION SYSTEM, METHODS OF MANAGING A COMMUNICATION SYSTEM AND MOBILE USER EQUIPMENT

CROSS-REFERENCE TO RELATED APPLICATIONS

This application is a continuation application which claims the benefit of U.S. patent application Ser. No. 09/493,487 filed on Jan. 28, 2000 now abandoned, the disclosure of which is fully incorporated herein by reference.

BACKGROUND OF THE INVENTION

The present invention relates to a communication system with at least two different access systems, wherein a first access system is capable of handling a first number of communications between a mobile user equipment and the first access system, and wherein a second access system is capable of handling a second number of communications between the mobile user equipment and the second access system.

The invention further relates to methods for managing a communication system with at least two different access systems, wherein a first access system is capable of handling a first number of communications between a mobile user equipment and the first access system, and wherein a second access system is capable of handling a second number of communications between the mobile user equipment and the second access system.

The invention further relates to a mobile user equipment capable of communicating in a communication system with at least two different access systems, wherein a first access system is capable of handling a first number of communications between a mobile user equipment and the first access system, and wherein a second access system is capable of handling a second number of communications between the mobile user equipment and the second access system.

Communication systems such as cellular and/or satellite based telephone systems have developed significantly in operations world-wide.

An important example of a communication system with a first access system and a second access system is an implementation of so-called "islands" of a new access system within an already existing access system. However, the invention is not limited to implementations of a new access system within an already existing access system, but applies to any communication system with at least two different access systems. The invention also refers to a communication system that is equipped differently within different service areas, for example giving users within cities a higher service quality than in rural regions.

Future communication systems will allow mobile user equipments to perform a greater number of communications simultaneously. Examples of the communication include telephone calls, faxes, downloading of data or uploading of data (file transfer). However, the invention is not limited to these examples. According to the invention, communication is not limited to any special form of transfer, neither to information transfer with establishing a connection nor to connectionless information transfer. According to the invention, communication includes connections as well as connectionless transfer of information such as Short Messaging Service (SMS). Future wireless scenarios for wideband wireless multimedia services can comprise: interactive news delivery (voice, video, E-mail, graphics), interactive e-mail (text, graphics, video clips), interactive audio (CD-quality voice, video, graphics), video conferencing, web browsing, dynamic Internet-based games, downloading large files from intranets or position/location-dependent "push" info.

An object of the invention is to create a communication system with a first access system and a second access system, wherein at least one of the access systems allows the mobile user equipment to perform more than one communication, wherein a intersystem handover of communication between the first access system and the second access system is possible.

A shortcoming of the known system is that an intersystem handover between the first access system and the second access system is not possible.

A further object of the invention is a method for managing a communication system with at least two different access systems, wherein a first access system is capable of handling a first number of communications between a mobile user equipment and the first access system and wherein a second access system is capable of handling a second number of communications between the mobile user equipment and the second access system. The method is carried out in a way that it is evaluated if a intersystem handover from the first access system to the second access system should be effected and if the intersystem handover is necessary maximally the second number of communications are handed over.

A further object of the invention is a method for managing a communication system with at least two different access systems, wherein a first access system is capable of handling a first number of communications between a mobile user equipment and the first access system and wherein a second access system is capable of handling a second number of communications between the mobile user equipment and the second access system. The method is carried out in a way that at least one of the communications is put on hold before the intersystem handover and kept on hold after the intersystem handover.

A further object of the invention is to provide a mobile user equipment, capable of communicating in a communication system with at least two different access systems. According to the invention, the mobile user equipment contains an indicator to indicate an intersystem handover to a mobile user.

Further advantageous embodiments and implementations are achieved according to the claims 2 to 14 and 16 to 37.

The invention makes use of the idea to distinguish between different communications and/or different types of communication. Thus the invention allows the communication system and/or the mobile user equipment to handover different communications and/or different types of communication in a different manner.

According to the invention, the problem is solved by a communication system with at least two different access systems, wherein a first access system is capable of handling a first number of communications between a mobile user equipment and the first access system and wherein a second access system is capable of handling a second number of communications between the mobile user equipment and the second access system. This is characterised in that the mobile user equipment and/or the communication system contains at least one means for making at least one decision which is capable of deciding which communications are handed over in the case that the mobile user equipment moves between the first access system and the second access system and in that the mobile user equipment and/or the communication system contain at least one means for executing the at least one decision.

The communication system allows mobile user equipments to communicate. A communication system consists of one access system. An access system consists of at least one access network and at least one core network. An access network consists at least of entities that manage the resources of the access network and provide the user with at least one mechanism to access the core network.

A core network consists at least of entities that provide support for the network features and telecommunication services. The support provided may include for example functionality such as the management of user location information, the control of network features and services, the transfer mechanisms for signalling and for user generated information.

An intersystem handover is a handover between a first and a second access system, or a handover within a first access system, in both cases between means with different capabilities.

As the invention is not limited to communication systems with UMTS and/or GSM as access systems, neither the access network nor the core network are limited to elements of UMTS implementations or GSM implementations. Each of the access systems may comprise at least one access network and at least one core network. As the invention relates to access systems with different capabilities of handling simultaneous communications, no special structure of the networks is required. Therefore the access network may be any installation, which is capable of giving mobile user equipments a capability of transferring information. The core network could be any installation, which is capable of transferring information to and/or from other communication systems, for example, a fixed network such as an Integrated Service Digital Network (ISDN), a Public Switched Telephone Network (PSTN) or a further mobile network.

As the invention relates to a large variety of communication systems, the nature and occasion of the means for making at least one decision which communication or communications are handed over in the case that the mobile user equipment would move between the first access system and the second access system, may vary too.

The means for making at least one decision may decide on the number and/or the identity of a communication or communications to be handed over. This includes also the case that no communication is handed over, for example when a mobile user decides not to continue a route in order to avoid a intersystem handover.

The mobile user equipment is capable of handing over at least one communication from the first access system to the second access system. Each of the access systems is capable of handling a certain number of communications for each of the mobile user equipments. A limitation of the number of communications originates for example in technical constraints as found in the conventional GSM system, which is capable of handling only one communication for the mobile user equipment. However, even systems which would principally allow a higher number of simultaneous communications for each of the mobile user equipments could be limited permanently or temporarily to a certain number of communications for each of the mobile user equipments.

Whereas an intersystem handover between an access system, that allows a lower number of simultaneous communications to an access system, which allows a higher number of simultaneous communications does not evoke problems, the intersystem handover in opposite directions is difficult.

The invention allows a management of different communications of a mobile user equipment which passes from a first access system with at least two, preferably more simultaneous communications to another access system allowing a lower number of simultaneous communications for each of the mobile user equipments.

The first access system comprises for example a Universal Mobile Telecommunication System (UMTS) and the second access system is a Global System for Mobile Telecommunication (GSM), or an Universal Mobile Telecommunication System (UMTS) which allows a lower number of simultaneous communications than the first access system.

The mobile user equipment is, for example, a mobile computer capable of communicating, a mobile telephone or a mobile multimedia system.

In an advantageous implementation of the communication system, the methods, and the mobile user equipment, the communication system contains at least one means for determining a capability of at least one of the access systems.

In a preferred embodiment of the communication system, the methods, and the mobile user equipment, the means for determining the capability is located in a core network.

In an advantageous implementation of the communication system, the methods, and the mobile user equipment, at least one access network of the communication system contains the means for executing the at least one decision.

In a preferred embodiment of the communication system, the methods, and the mobile user equipment, a core network contains the means for executing the at least one decision.

In a further advantageous implementation of the communication system, the methods, and the mobile user equipment, the mobile user equipment contains the means for executing the at least one decision.

In a preferred embodiment of the communication system, the methods, and the mobile user equipment, at least one access network of the communication system contains the means for making at least one decision.

In a further advantageous implementation of the communication system, the methods, and the mobile user equipment, a core network contains the means for making at least one decision.

In a preferred embodiment of the communication system, the methods, and the mobile user equipment, the mobile user equipment contains the means for making at least one decision.

In a preferred embodiment of the communication system, the methods, and the mobile user equipment, the communication system contains a means for making at least one decision whether an intersystem handover is necessary.

In an advantageous implementation of the communication system, the methods, and the mobile user equipment, the means for making at least one decision whether an intersystem handover is necessary is a device (DPH).

In a further advantageous implementation of the communication system, the methods, and the mobile user equipment, the device (DPH) is located in an access network (AN).

In an advantageous implementation of the communication system, the methods, and the mobile user equipment, the device is located in a radio network controller.

In a further advantageous implementation of the communication system, the methods, and the mobile user equipment, the device is located in a core network (CN).

In an advantageous implementation of the communication system, the methods, and the mobile user equipment, a Base Station Controller (BSC) and one or more Base Transceiver Stations (BTS) constitute an access network of the communication system. Within an implementation of a Global System for Mobile Communication (GSM) every mobile user equipment is linked to one Base Transceiver Station (BTS). In other access systems like implementations of a Universal Mobile Telecommunication System (UMTS) each of the mobile user equipments may be in a contact with more than one Base Transceiver Station (BTS).

In a preferred embodiment of the communication system, the methods, and the mobile user equipment, it is evaluated if an intersystem handover from the first access system to the second access system should be effected, wherein in the case that the intersystem handover is necessary at least one communication can be handed over.

In an advantageous implementation of the communication system, the methods, and the mobile user equipment, an access network sends an intersystem handover query to the mobile user equipment.

In a preferred embodiment of the communication system, the methods, and the mobile user equipment, the access network signals a core network before the access network sends the intersystem handover query to the mobile user equipment.

In a further advantageous implementation of the communication system, the methods, and the mobile user equipment, the core network adds information about a communication or communications that can be supported.

This information is based on a capability of at least one of the access systems, especially the capability of the access system to which the communication or communications are handed over.

In an advantageous implementation of the communication system, the methods, and the mobile user equipment, a mobile user decides about the communication or the communications which should be handed over to the second access system.

This decision can be taken at any suitable time, for example, in a setup message of the communication or after a signal that an intersystem handover is necessary.

In a preferred embodiment of the communication system, the methods, and the mobile user equipment, the mobile user equipment informs the access network about the communication or the communications which should be handed over to the second access system.

In an advantageous implementation of the communication system, the methods, and the mobile user equipment, the mobile user equipment informs the access network about the communication or the communications which should be handed over to the second access system at a communication setup.

In a preferred embodiment of the communication system, the methods, and the mobile user equipment, the mobile user equipment receives an intersystem handover query for intersystem handover towards the second access system and afterwards the mobile user equipment disconnects all connections, that cannot be kept in the second access system.

In a further advantageous implementation of the communication system, the methods, and the mobile user equipment, the core network decides which communication or communications should be handed over to the second access system.

The decision which communication or communications should be handed over to the second access system includes the case that no communication is handed over. An intersystem handover can be rejected by the access system, the mobile user equipment or the mobile user. The mobile user, for example, may decide to remain within a service area which is covered by the first access system.

In an advantageous implementation of the communication system, the methods, and the mobile user equipment, the mobile user equipment contains an information interface, for example an indicator either visual, audio and/or tactile example given a blinking light, to inform the mobile user about a potential intersystem handover. Therefore the mobile user can avoid an intersystem handover by stopping a movement out of the service area which is covered by the first access system.

In a preferred embodiment of the communication system, the methods, and the mobile user equipment, the core network disconnects all calls which cannot be kept in the second access system.

In an advantageous implementation of the communication system, the methods, and the mobile user equipment, at least one decision about a communication or communications which are handed over in the case that the mobile user equipment (NUE) would move between the first access system and the second access system depends on at least one presetting.

In a preferred embodiment of the communication system, the methods, and the mobile user equipment, the presettings are located within a mobile user equipment.

In an advantageous implementation of the communication system, the methods, and the mobile user equipment, the presettings are transferred to the core network within an initial user equipment (IUE) message and/or in a setup message.

An initial user equipment (IUE) message is a message sent, before and independent of a setup message, containing at least information about presettings for an intersystem handover.

In a further advantageous implementation of the communication system, the methods, and the mobile user equipment, a message which depends on the presettings is sent to the core network after the core network has sent a request to the mobile user equipment.

In a preferred embodiment of the communication system, the methods, and the mobile user equipment, the message depends only on the presettings.

In an advantageous implementation of the communication system, the methods, and the mobile user equipment, the message depends also on an active decision of a mobile user.

In a further advantageous implementation of the communication system, the methods, and the mobile user equipment, the presettings are stored within an access network and/or an core network.

In a preferred embodiment of the communication system, the methods, and the mobile user equipment, the presettings can be different for different mobile users.

In an advantageous implementation of the communication system, the methods, and the mobile user equipment, the presettings are identical for all users.

In a preferred embodiment of the communication system, the methods, and the mobile user equipment, the presettings can be different for different categories of communications. Examples for different categories of communications are speech or data calls.

In an advantageous implementation of the communication system, the methods, and the mobile user equipment, the presettings can be different for different priorities.

An example for a priority call is emergency calls.

In a preferred embodiment of the communication system, the methods, and the mobile user equipment, the presettings are defined and/or modified by an operator.

In an advantageous implementation of the communication system, the methods, and the mobile user equipment, the presettings are defined and/or modified by a mobile user.

In a further advantageous implementation of the communication system, the methods, and the mobile user equipment, at least one of the communications is put on hold before the intersystem handover and kept on hold after the intersystem handover.

The invention also solves the problem to hand over multi-party calls. If one or more communication is put on hold, it is possible to reactivate the communication at a later time. However, the method of putting at least one communication on hold before the intersystem handover, to keep it on hold after the intersystem handover and to reactivate the communication at a later moment also applies to other communications as data communications. For example, if a mobile user equipment with an activated speech call and an activated down load of a file moves towards an access system which allows only one simultaneous communication, the data communication is put on hold and reactivated later, especially after the mobile user equipment has finished the speech call or has once again moved towards a third access system which allows more than one simultaneous communication.

In a preferred embodiment of the communication system, the methods, and the mobile user equipment, the mobile user equipment (MUE) puts the communication on hold.

In a further advantageous implementation of the communication system, the methods, and the mobile user equipment, the core network (CN) puts the communication on hold.

In a preferred embodiment of the communication system, the methods, and the mobile user equipment, a mobile user is informed before the intersystem handover. This allows a decision of the mobile user about a communication or communications he would like to maintain.

BRIEF DESCRIPTION OF THE DRAWINGS

For a more complete understanding of the present invention, and the advantages thereof, reference is now made to the following descriptions taken in conjunction with the accompanying drawings, wherein like numbers designate like objects, and in which.

DETAILED DESCRIPTION OF THE INVENTION

According to FIGS. 1, 2, 3, 4, 5, 6, 7, 8, 9, 10 and 11 the present invention is described in conjunction with an intersystem handover from a Universal Mobile Telecommunication System (UMTS) as a first access system and a Global System for a Mobile Communication System (GSM). However, the examples are not limited to an intersystem handover from a Universal Mobile Telecommunication System (UMTS) to a Global System for Mobile Communication (GSM) but include all types of handover between an access system with a high number of simultaneous communications to an access system with a lower number of simultaneous communications. The different number of simultaneous communications could have technical or non-technical reasons, for example different operators of the access systems. For simplicity the second core network belonging to the second access system is omitted from the figures.

Means for making at least one decision which are capable of deciding which communication or communications are handed over in the case that a mobile user equipment MUE would move between the first access system and the second access system are afterwards described by an logical element LE. Means for executing the at least one decision are afterwards described by examples of execution elements EE. The elements may be realised physically or virtually.

The sequences according to the FIG. 1, 2, 3, 4, 5, 6, 7, 8, 9, 10 or 11 are only a part of signal transfer processes.

To achieve an efficient intersystem handover from UMTS to GSM different solutions to decide whether the intersystem handover is necessary may be implemented. Each of them could be combined with each of the sequences according to the FIG. 1, 2, 3, 4, 5, 6, 7, 8, 9, 10 or 11.

It is preferred, that at least one message includes a measurement control MCT. A measurement control MCT is carried out most advantageously in one of the following manners: An access network AN commands a mobile user equipment MUE to perform measurements. The type of measurements may be adapted to physical parameters of the access systems. Examples of the measurements are:

Radio link measurements. In this case measurements are performed on down link radio links in an active set.

Intra-frequency measurements. In this case measurements on down link physical channels that do not belong to the active set but have the same frequency as the active set are performed.

Inter-frequency measurements. In this case measurements on down link physical channels with frequencies that differ from the frequency of the active set are performed.

Inter-system measurements. In this case measurements on down link physical channels belonging to another radio access system than the access network AN are performed.

Traffic volume measurements. In this case measurements on up link traffic volume are performed.

Afterwards the mobile user equipment MUE gives a measurement report to the access network AN.

Figure 1:
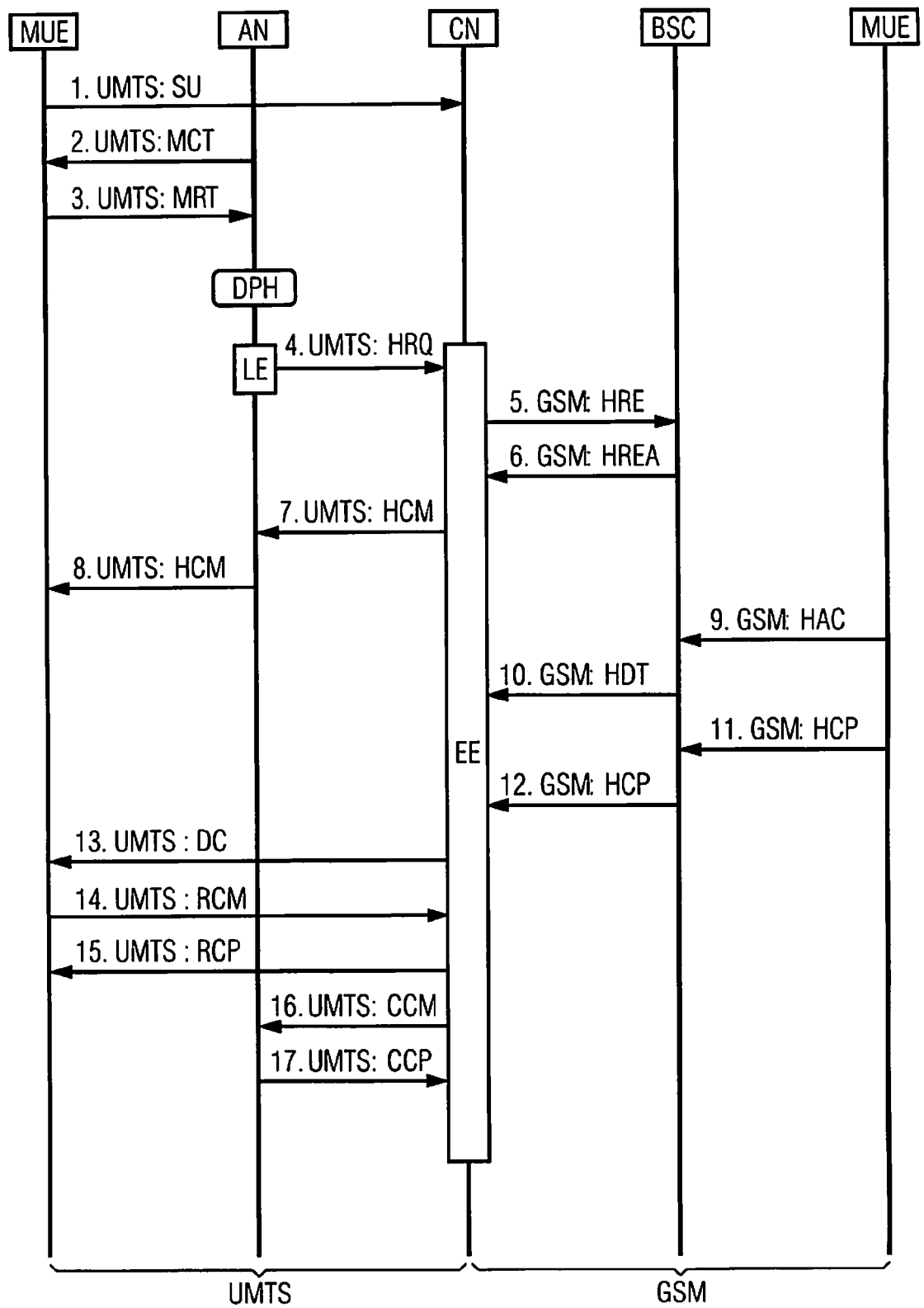
FIG. 1 shows sequences for a first implementation of an intersystem handover procedure according to the invention.

FIG. 1 shows a first advantageous implementation of the invention.

The communication is set up between a mobile user equipment MUE and a first access system of a communication system.

Actual propositions for standards include at least one setup message for each communication. If a first number n of communications is established, n setup messages SU are transmitted. However, to facilitate the understanding of the figure, the setup messages SU are represented by one arrow. Effectively, the setup message SU is repeated n times.

Permanently or after certain time intervals the number of active radio links between a mobile user equipment and an access network is checked. If this number is low, especially if only one link is found, measurements are performed.

Preferably, it is evaluated how many base stations of the first access system the mobile user equipment has contact. If the number is low, especially if the mobile user equipment is connected to only one base station of the first access system, an access network AN of the first access system, especially a Universal Mobile Telecommunication System UMTS, decides, whether an intersystem handover should be effected. By this a decision that a handover is needed is carried out earlier.

The type of measurements is adapted to physical parameters of the access systems. Examples of the measurements are: radio link measurements, intra-frequency measurements, inter-frequency measurements, or traffic volume measurements.

A measurement report MRT is sent from the mobile user equipment MUE to the access network AN.

The access network AN contains a device DPH, capable of deciding, whether an intersystem handover is necessary and a logical element LE for deciding which communication or communications are to be handed over.

If the device DPH decides, that an intersystem handover is necessary, the procedure continues as described below.

The access network AN informs a core network CN that a intersystem handover is required by at least one handover request signal HRQ.

The core network CN contains an execution element EE for executing the intersystem handover.

The core network CN sends a message HRE to a base station controller BSC of the second access system, especially a Global System for Mobile Communication GSM, that it requests a handover. The signal is one step according to the sequence-diagram represented in FIG. 1.

Afterwards the base station controller BSC sends a message for handover request acceptance HREA to the core network CN, for example to indicate that the resources for the requested communication or communications are available.

Within the first access system, especially a Universal Mobile Telecommunication System UMTS, a handover command HCM is sent to the access network AN of the first access system.

The access network AN transmits afterwards the handover command HCM to the mobile user equipment MUE. The mobile user equipment MUE sends a handover access HAC to the base station controller BSC.

The base station controller BSC sends afterwards a handover detect signal HDT to the core network CN.

After completing the handover the mobile user equipment MUE sends a handover complete HCP signal to the base station controller BSC.

The base station controller BSC sends the handover complete signal HCP to the core network CN.

If a first number n of communications has been established and a second, lower number m of communications is handed over, n-m communications have to be released.

For each communication which is not handed over a disconnect order DC, a release command RCM and a release complete signal RCP are sent. The disconnect order DC is sent from the core network CN to the mobile user equipment MUE. The mobile user equipment sends afterwards the release command RCM to the core network CN. The release complete signal RCP is sent from the core network CN to the mobile user equipment MUE.

Effectively, the release command RCM and the release complete signal RCP are repeated n-m times to release n-m communications. However, to facilitate the understanding of the figure, the release command RCM and the release complete signal RCP messages are represented by two arrows.

To clear the signalling connections to the first access network, the core network CN sends a clear command CCM to the access network AN. The access network AN signals afterwards a clear complete CCP signal to the core network.

Figure 2:
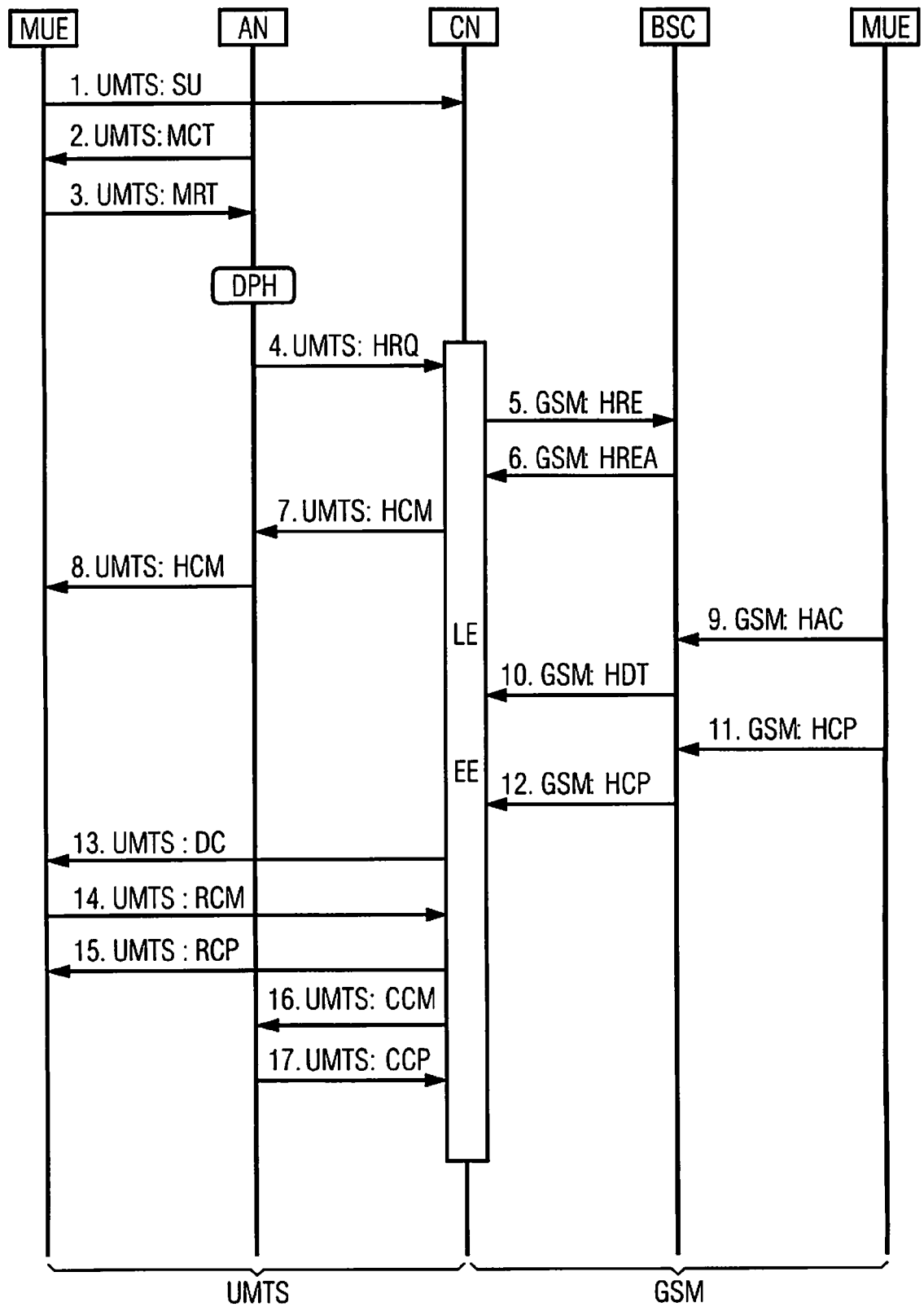
FIG. 2 shows sequences for a second implementation of an intersystem handover procedure according to the invention.

FIG. 2 shows a second advantageous implementation of the invention.

The communication is set up between a mobile user equipment MUE and a first access system of a communication system.

If a first number n of communications is established, n setup messages SU are transmitted. However, to facilitate the understanding of the figure, the setup messages SU are represented by one arrow. Effectively, the setup message SU is repeated n times.

It is evaluated with how many base stations of the first access system the mobile user equipment has contact. If the number is low, especially if the mobile user equipment is connected to only one base station of the first access system an access network AN of the first access system, especially a Universal Mobile Telecommunication System UMTS, commands the mobile user equipment MUE to perform measurements.

The type of measurements is adapted to physical parameters of the access systems. Examples of the measurements are: radio link measurements, intra-frequency measurements, Inter-frequency measurements, or traffic volume measurements.

A measurement report MRT is sent from the mobile user equipment MUE to the access network AN.

The access network AN contains a device DPH, capable of deciding, whether a intersystem handover is necessary.

If the device DPH decides, that a intersystem handover is necessary, the procedure continues as described below.

The access network AN informs a core network CN that a intersystem handover is required by at least one handover request signal HRQ.

The core network CN contains a logical element LE for deciding which communication or communications are handed over and an execution element EE for executing the intersystem handover.

The core network CN sends a message HRE to a base station controller BSC of the second access system, especially a Global System for Mobile Communication GSM, that it requests a handover.

Afterwards the base station controller BSC sends a message for handover request acceptance HREA to the core network CN, for example to indicate that the resources for the requested communication or communications are available.

Within the first access system, especially a Universal Mobile Telecommunication System UMTS, a handover command HCM is sent to the access network AN of the first access system.

The access network AN transmits afterwards the handover command HCM to the mobile user equipment MUE. The mobile user equipment MUE sends a handover access HAC to the base station controller BSC.

The base station controller BSC sends afterwards a handover detect signal HDT to the core network CN.

After completing the intersystem handover the mobile user equipment MUE sends a handover complete HCP signal to the base station controller BSC.

The base station controller BSC sends the handover complete signal HCP to the core network CN.

The communication is released before a communication between a mobile user equipment MUE and a first access system of a communication system is disconnected.

If a first number n of communications has been established and a second, lower number m of communications is handed over, n-m communications have to be released.

For each communication which is not handed over a disconnect order DC, a release command RCM and a release complete signal RCP are sent. The disconnect order DC is sent from the core network CN to the mobile user equipment MUE. The mobile user equipment sends afterwards the release command RCM to the core network CN. The release complete signal RCP is sent from the core network CN to the mobile user equipment MUE.

Effectively, the release command RCM and the release complete signal RCP are repeated n-m times to release n-m communications. However, to facilitate the understanding of the figure, the release command RCM and the release complete signal RCP messages are represented by two arrows.

To clear the signalling connections to the first access network, the core network CN sends a clear command CCM to the access network AN. The access network AN signals afterwards a clear complete CCP signal to the core network.

Figure 3:
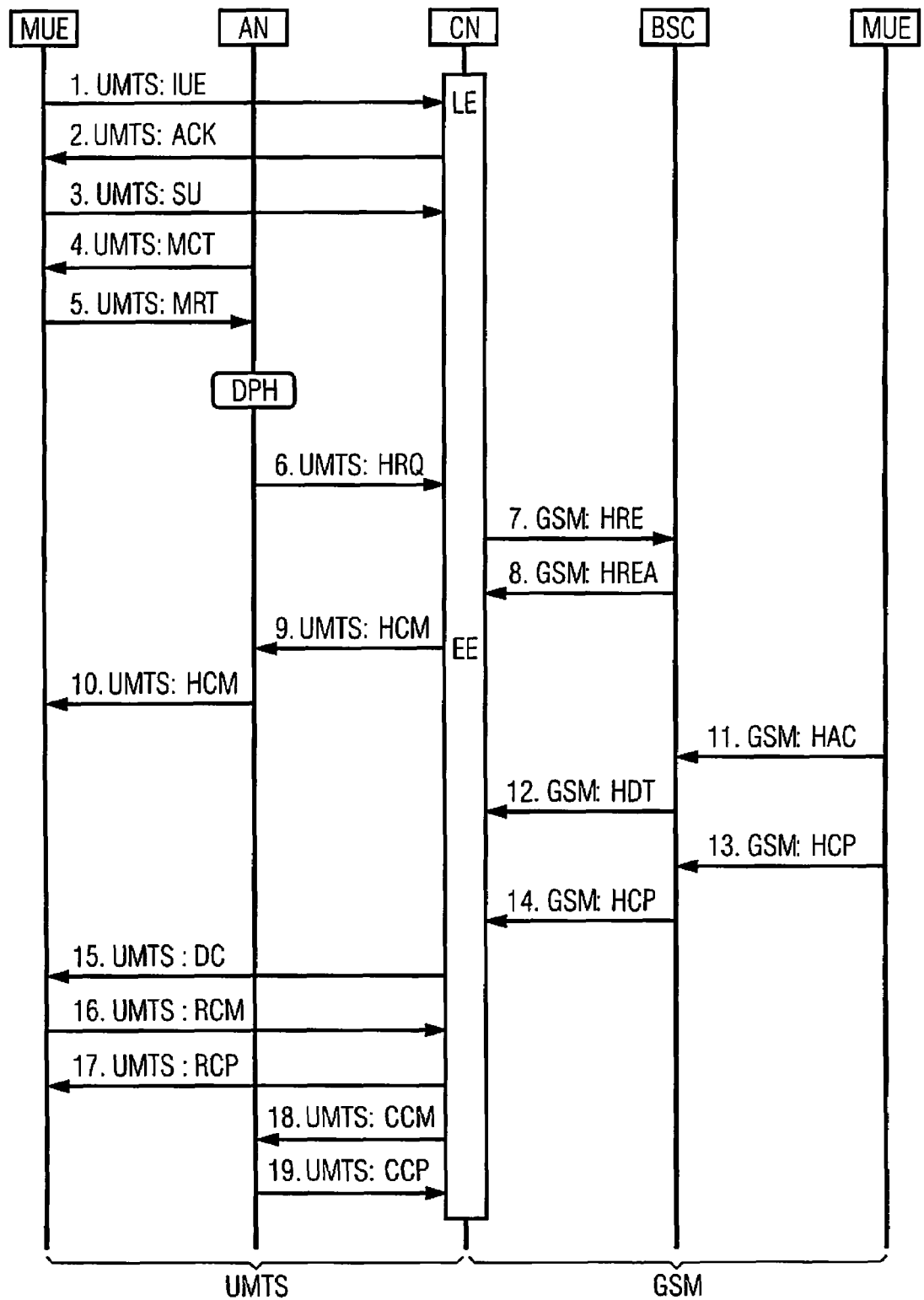
FIG. 3 shows sequences for a third implementation of an intersystem handover procedure according to the invention.

FIG. 3 shows a third advantageous implementation of the invention.

This implementation makes use of the concept, that a mobile user equipment MUE sends to a core network CN of a communication system Initial User Equipment message IUE with information about calls to keep. The information could be—depending on a service value of the communication system—a preference or a definitive order to hand over certain calls.

In this preferred implementation, the information IUE about calls to keep is sent before the communications are established. However, sending the information about calls to keep later, is also possible in the setup message.

After the information IUE about calls to keep has been sent from the mobile user equipment MUE to the core network CN of the communication system, the core network CN could send an acknowledge signal ACK to the mobile user equipment MUE. However, this is in no way necessary.

The communication is set up between a mobile user equipment MUE and a first access system of a communication system.

If a first number n of communications is established, n setup messages SU are transmitted. However, to facilitate the understanding of the figure, the setup messages SU are represented by one arrow. Effectively, the setup message SU is repeated n times.

It is evaluated with how many base stations of the first access system the mobile user equipment has contact. If the number is low, especially if the mobile user equipment is connected to only one base station of the first access system an access network AN commands the mobile user equipment MUE to perform measurements.

The type of measurements is adapted to physical parameters of the access systems. Examples of the measurements are: radio link measurements, intra-frequency measurements, Inter-frequency measurements, or traffic volume measurements.

A measurement report MRT is sent from the mobile user equipment MUE to the access network AN.

The access network AN contains a device DPH, capable of deciding, whether a intersystem handover is necessary.

If the device DPH decides, that a intersystem handover is necessary, the procedure continues as described below.

The access network AN informs a core network CN that a intersystem handover is required by at least one handover request signal HRQ.

The core network CN contains a logical element and an execution element EE for executing the intersystem handover.

The core network CN informs a base station controller BSC of the second access system, especially a Global System for Mobile Communication GSM, that it requires an intersystem handover.

Afterwards the base station controller BSC sends a message for handover request acceptance HREA to the core network CN, for example to indicate that the resources for the requested communications are available.

Within the first access system, especially a Universal Mobile Telecommunication System UMTS, a handover command HCM is sent to the access network AN of the first access system.

The access network AN transmits afterwards the handover command HCM to the mobile user equipment MUE. The mobile user equipment MUE sends a handover access HAC to the base station controller BSC.

The base station controller BSC sends afterwards a handover detect signal HDT to the core network CN.

After completing the intersystem handover the mobile user equipment MUE sends a handover complete HCP signal to the base station controller BSC.

The base station controller BSC sends the handover complete signal HCP to the core network CN.

The communication is released before a communication between the mobile user equipment MUE and the first access system of a communication system is disconnected.

If a first number n of communications has been established and a second, lower number m of communications is handed over, n-m communications have to be released.

For each communication which is not handed over a disconnect order DC, a release command RCM and a release complete signal RCP are sent. The disconnect order DC is sent from the core network CN to the mobile user equipment MUE. The mobile user equipment sends afterwards the release command RCM to the core network CN. The release complete signal RCP is sent from the core network CN to the mobile user equipment MUE.

Effectively, the release command RCM and the release complete signal RCP are repeated n-m times to release n-m communications. However, to facilitate the understanding of the figure, the release command RCM and the release complete signal RCP messages are represented by two arrows.

To clear the signalling connections to the first access network, the core network CN sends a clear command CCM to the access network AN. The access network AN signals afterwards a clear complete CCP signal to the core network.

Figure 4:
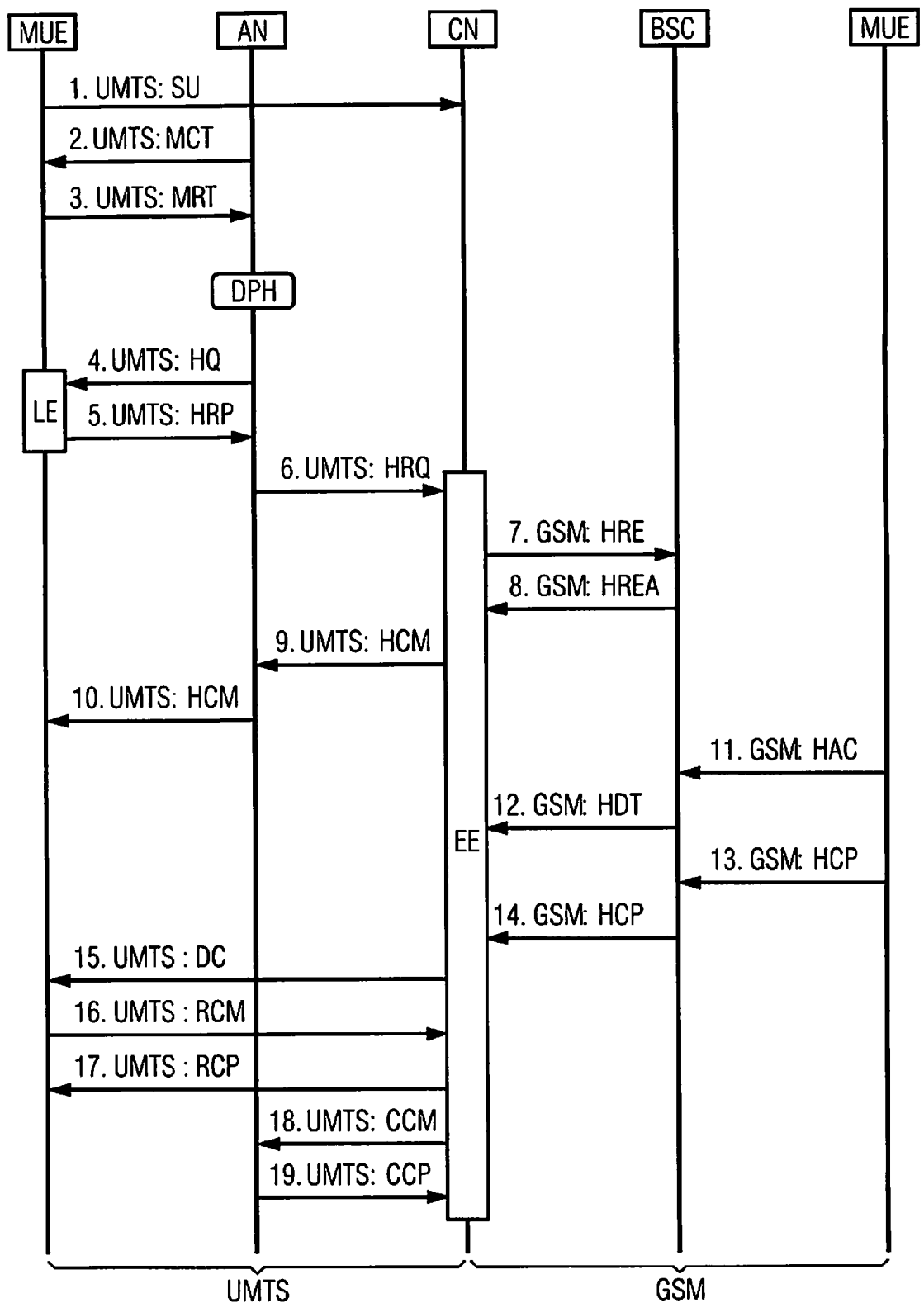
FIG. 4 shows sequences for a fourth implementation of an intersystem handover procedure according to the invention.

FIG. 4 shows a fourth advantageous implementation of the invention.

The communication is set up between a mobile user equipment MUE and a first access system of a communication system.

If a first number n of communications is established, n setup messages SU are transmitted. However, to facilitate the understanding of the figure, the setup messages SU are represented by one arrow. Effectively, the setup message SU is repeated n times.

It is evaluated with how many base stations of the first access system the mobile user equipment has contact. If the number is low, especially if the mobile user equipment is connected to only one base station of the first access system an access network AN of the first access system, especially a Universal Mobile Telecommunication System UMTS, commands the mobile user equipment MUE to perform measurements.

The type of measurements is adapted to physical parameters of the access systems. Examples of the measurements are: radio link measurements, intra-frequency measurements, Inter-frequency measurements, or traffic volume measurements.

A measurement report MRT is sent from the mobile user equipment MUE to the access network AN.

The access network AN contains a device DPH, capable of deciding, whether a intersystem handover is necessary.

The mobile user equipment MUE contains a logical element LE, which is which is capable of deciding which communications are handed over.

If the device DPH decides, that an intersystem handover is necessary, the procedure continues as described below.

A handover query HQ is signalled from the access network AN to the mobile user equipment MUE to ask the mobile user equipment MUE which communication or communications are to be saved. Afterwards the mobile user equipment sends a handover response HRP to the access network AN. The access network AN informs a core network CN that an intersystem handover is required by at least one handover request signal HRQ.

The core network CN informs a base station controller BSC of the second access system, especially a Global System for Mobile Communication GSM, that it requires a intersystem handover by sending a handover request signal HRE to the base station controller BSC.

Afterwards the base station controller BSC sends a message for handover request acceptance HREA to the core network CN, for example to indicate that the resources for the requested communication or communications are available.

Within the first access system, especially a Universal Mobile Telecommunication System UMTS, a handover command HCM is sent to the access network AN of the first access system.

The access network AN transmits afterwards the handover command HCM to the mobile user equipment MUE. The mobile user equipment MUE sends a handover access HAC to the base station controller BSC.

The base station controller BSC sends afterwards an intersystem handover detect signal HDT to the core network CN.

After completing the intersystem handover the mobile user equipment MUE sends a handover complete HCP signal to the base station controller BSC.

The base station controller BSC sends the handover complete signal HCP to the core network CN.

The communication is released before a communication between a mobile user equipment MUE and a first access system of a communication system is disconnected.

If a first number n of communications has been established and a second, lower number m of communications is handed over, n-m communications have to be released.

For each communication which is not handed over a disconnect order DC, a release command RCM and a release complete signal RCP are sent. The disconnect order DC is sent from the core network CN to the mobile user equipment MUE. The mobile user equipment sends afterwards the release command RCM to the core network CN. The release complete signal RCP is sent from the core network CN to the mobile user equipment MUE.

Effectively, the release command RCM and the release complete signal RCP are repeated n-m times to release n-m communications. However, to facilitate the understanding of the figure, the release command RCM and the release complete signal RCP messages are represented by two arrows.

To clear the signalling connection to the first access network, the core network CN sends a clear command CCM to the access network AN. The access network AN signals afterwards a clear complete CCP signal to the core network.

Figure 5:
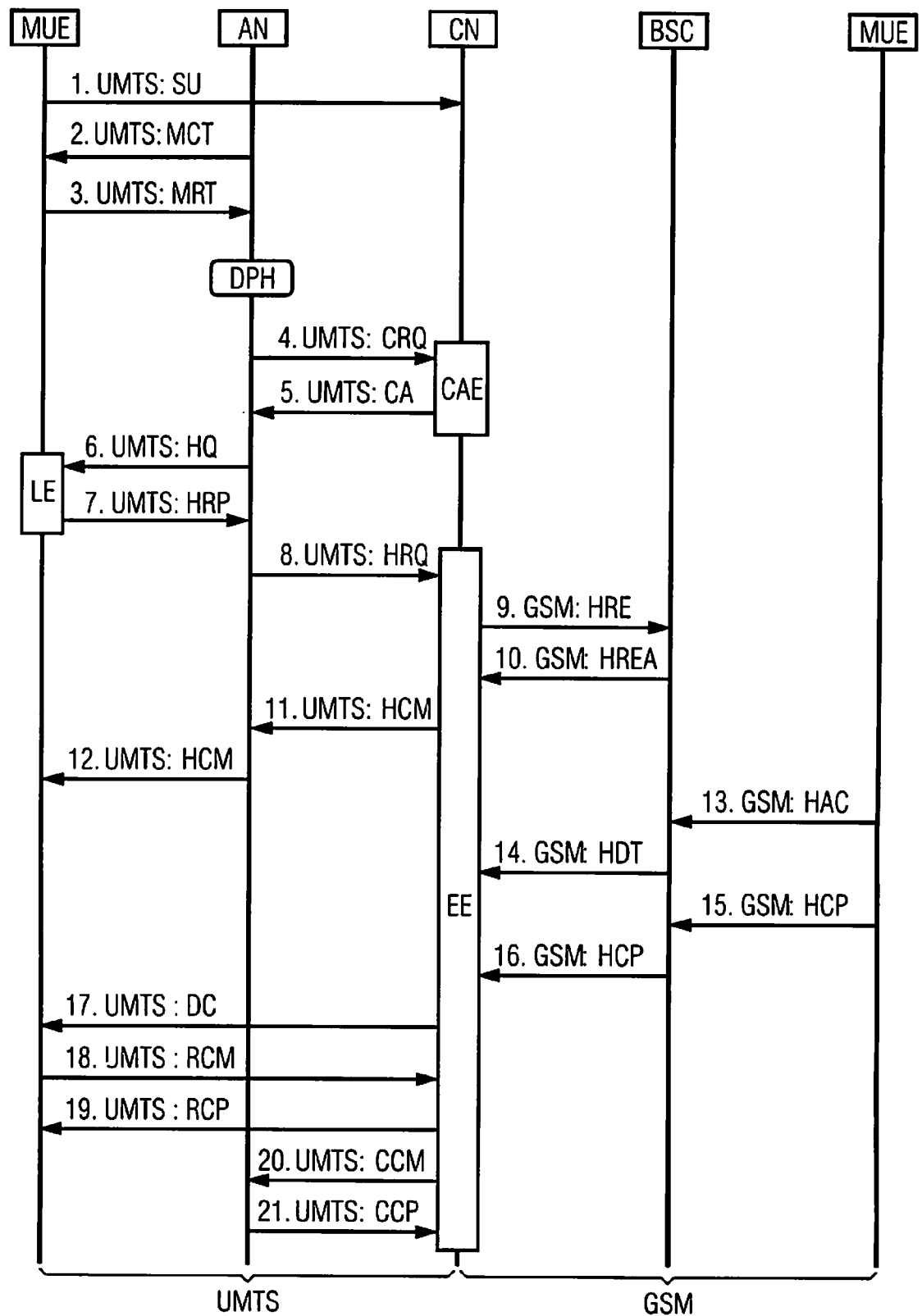
FIG. 5 shows sequences for a fifth implementation of an intersystem handover procedure according to the invention.

FIG. 5 shows a fifth advantageous implementation of the invention.

The communication is set up between a mobile user equipment MUE and a first access system of a communication system.

If a first number n of communications is established, n setup messages SU are transmitted. However, to facilitate the understanding of the figure, the setup messages SU are represented by one arrow. Effectively, the setup message SU is repeated n times.

It is evaluated with how many base stations of the first access system the mobile user equipment has contact. If the number is low, especially if the mobile user equipment is connected to only one base station of the first access system an access network AN of the first access system, especially a Terrestrial Radio Access Network UTRAN of an Universal Mobile Telecommunication System UMTS, commands the mobile user equipment MUE to perform measurements.

The type of measurements is adapted to physical parameters of the access systems. Examples of the measurements are: radio link measurements, intra-frequency measurements, Inter-frequency measurements, or traffic volume measurements.

A measurement report MRT is sent from the mobile user equipment MUE to the access network AN.

The access network AN contains a device DPH, capable of deciding, whether an intersystem handover is necessary.

The mobile user equipment MUE contains a logical element LE, which is which is capable of deciding which communication or communications are handed over.

If the device DPH decides, that an intersystem handover is necessary, the procedure continues as described below.

The access network AN sends a capability request CRQ to the core network CN. The core network CN contains a capability analysis element CAE, which performs measurements and/or calculation about capabilities in the network. Thus, the capability analysis element CAE is a means for determining a capability of the network.

A content of a capability answer CA, which is afterwards sent to the access network AN depends on a capability which the capability analysis element CAE has notified as available.

A handover query HQ is signalled from the access network AN to the mobile user equipment MUE to ask the mobile user equipment MUE which communications are to be saved. Afterwards the mobile user equipment sends a handover response HRP to the access network AN. The access network AN informs a core network CN that an intersystem handover is required by at least one handover request signal HRQ.

The core network CN informs a base station controller BSC of the second access system, especially a Global System for Mobile Communication GSM, that it requires an intersystem handover by sending a handover request signal HRE to the base station controller BSC.

Afterwards the base station controller BSC sends a message for handover request acceptance HREA to the core network CN, for example to indicate that the resources for the requested communication or communications are available.

Within the first access system, especially a Universal Mobile Telecommunication System UMTS, a handover command HCM is sent to the access network AN of the first access system.

The access network AN transmits afterwards the handover command HCM to the mobile user equipment MUE. The mobile user equipment MUE sends a handover access HAC to the base station controller BSC.

The base station controller BSC sends afterwards a handover detect signal HDT to the core network CN.

After completing the intersystem handover the mobile user equipment MUE sends a handover complete HCP signal to the base station controller BSC.

The base station controller BSC sends the handover complete signal HCP to the core network CN.

The communication is released before a communication between a mobile user equipment MUE and a first access system of a communication system is disconnected.

If a first number n of communications has been established and a second, lower number m of communications is handed over, n-m communications have to be released.

For each communication which is not handed over a disconnect order DC, a release command RCM and a release complete signal RCP are sent. The disconnect order DC is sent from the core network CN to the mobile user equipment MUE. The mobile user equipment sends afterwards the release command RCM to the core network CN. The release complete signal RCP is sent from the core network CN to the mobile user equipment MUE.

Effectively, the release command RCM and the release complete signal RCP are repeated n-m times to release n-m communications. However, to facilitate the understanding of the figure, the release command RCM and the release complete signal RCP messages are represented by two arrows.

To clear the signalling connection to the first access network, the core network CN sends a clear command CCM to the access network AN. The access network AN signals afterwards a clear complete CCP signal to the core network.

Figure 6:
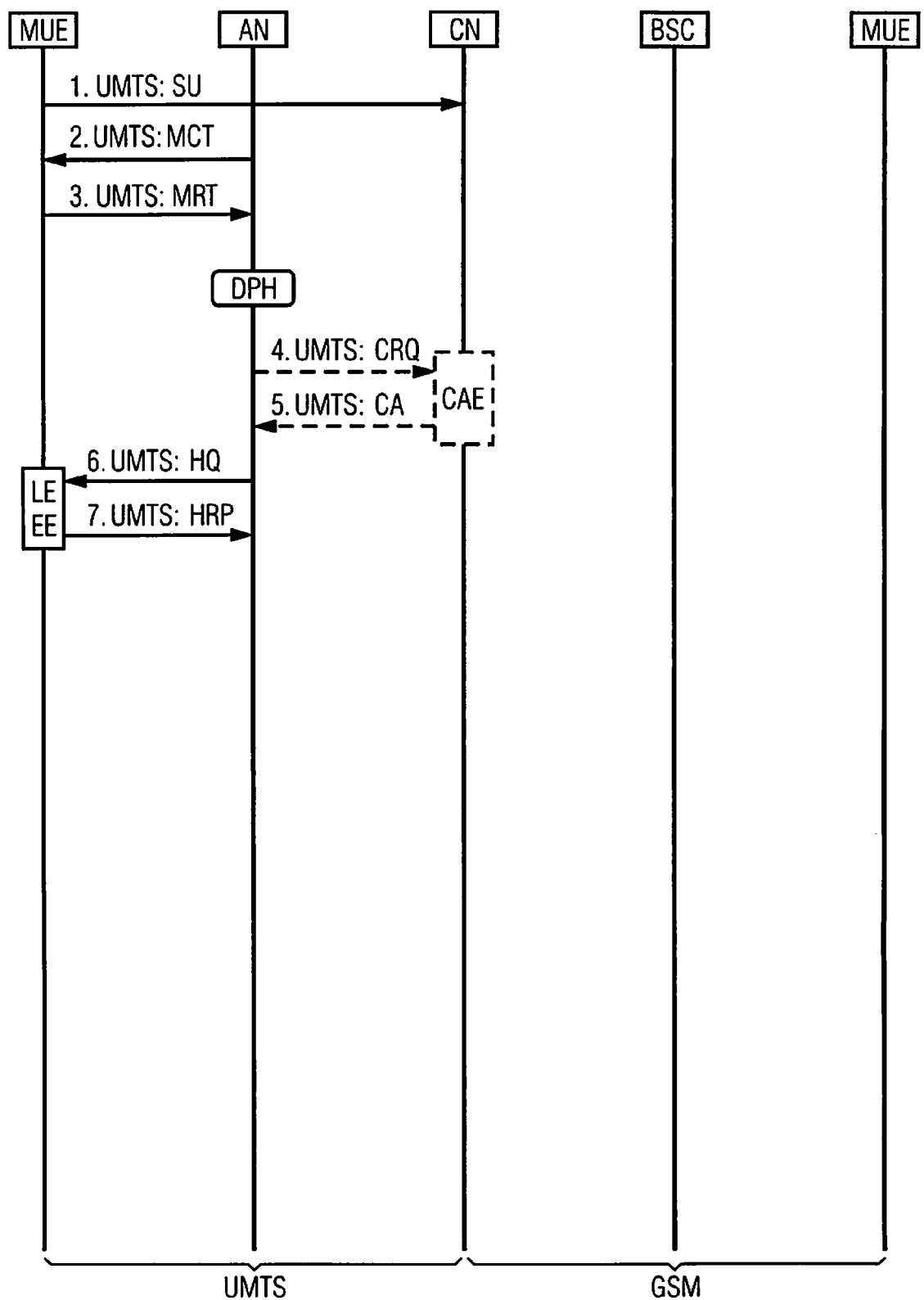
FIG. 6 shows sequences for a sixth implementation of an intersystem handover procedure according to the invention.

According to FIG. 6 an alternative solution is described in which a mobile user equipment contains a logical element LE and an execution element EE.

The communication is set up between a mobile user equipment MUE and a first access system of a communication system.

If a first number n of communications is established, n setup messages SU are transmitted. However, to facilitate the understanding of the figure, the setup messages SU are represented by one arrow. Effectively, the setup message SU is repeated n times.

It is evaluated with how many base stations of the first access system the mobile user equipment has contact. If the number is low, especially if the mobile user equipment is connected to only one base station of the first access system an access network AN of the first access system, especially a Universal Mobile Telecommunication System UMTS, commands the mobile user equipment MUE to perform measurements.

The type of measurements is adapted to physical parameters of the access systems. Examples of the measurements are: radio link measurements, intra-frequency measurements, Inter-frequency measurements, or traffic volume measurements.

A measurement report MRT is sent from the mobile user equipment MUE to the access network AN.

The access network AN contains a device DPH, capable of deciding, whether an intersystem handover is necessary.

The mobile user equipment MUE contains a logical element LE, which is capable of deciding which communication or communications are handed over.

If the device DPH decides, that an intersystem handover is necessary, the procedure continues as described below.

The access network AN may send a capability request CRQ to the core network CN. The core network CN contains a capability analysis element CAE, which performs measurements and/or calculation about capabilities in the network. Thus, the capability analysis element CAE is a means for determining a capability of the network.

A content of a capability answer CA, which is afterwards sent to the access network AN depends on a capability which the capability analysis element CAE has notified as available.

The capability analysis element CAE as well as the capability request CRQ and the capability answer CA are advantageous but not necessary.

A handover query HQ is signalled from the access network AN to the mobile user equipment MUE. Afterwards the mobile user equipment sends a handover response HRP to the access network AN.

A mobile user decides to remain within the first access system after he has been informed that at least one of the communications of the mobile user equipment MUE would be interrupted in the case of a handover. Access network is informed about this with a handover response message HRP.

Figure 7:
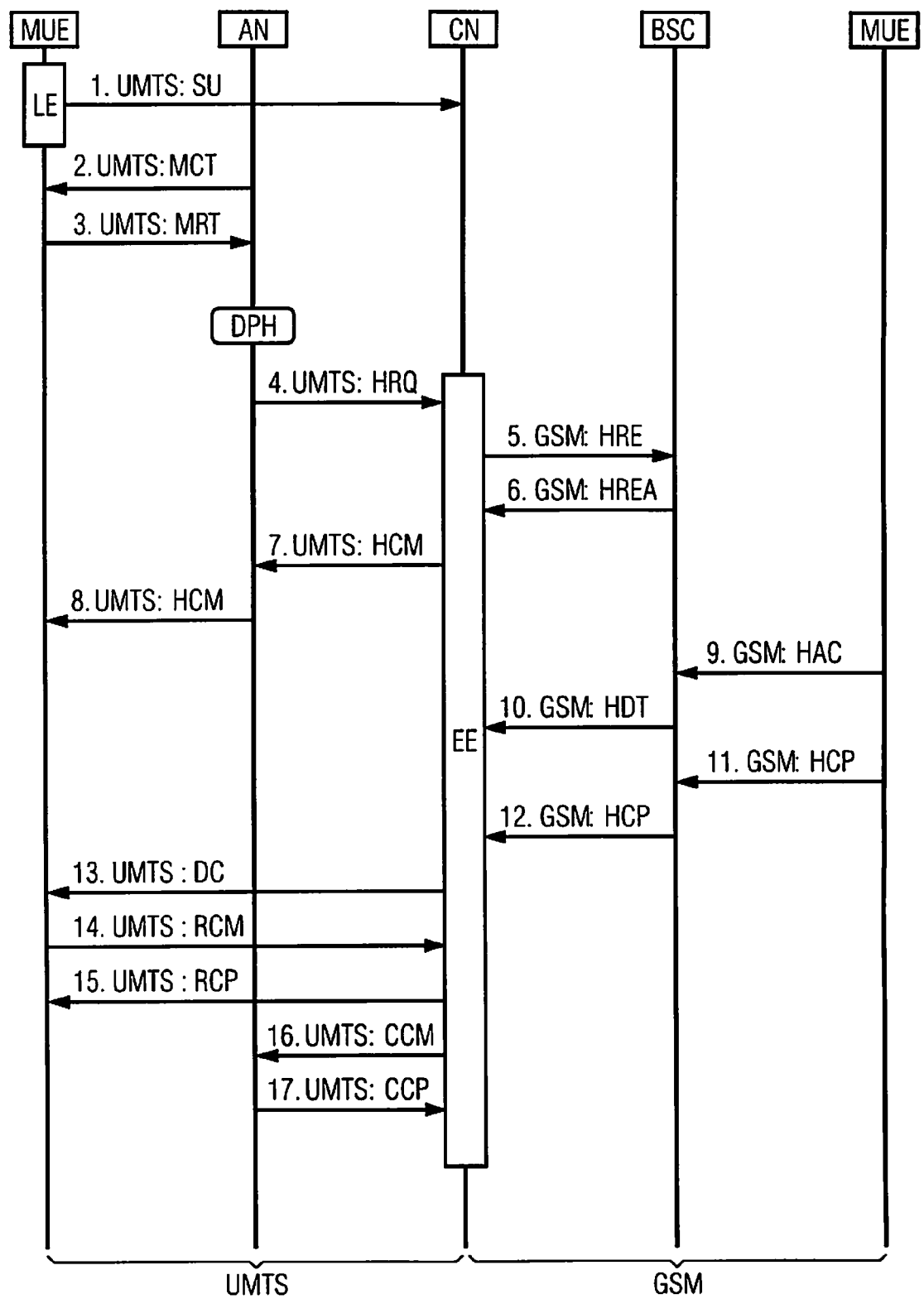
FIG. 7 shows sequences for a seventh implementation of an intersystem handover procedure according to the invention.

A preferred embodiment of the invention which is described according to FIG. 7 includes a logical element LE within a mobile user equipment MUE. The logical element LE is capable of deciding which communication or communications are handed over in the case that the mobile user equipment MUE would move between a first access system and a second access system.

The communication is set up between the mobile user equipment MUE and the first access system of the communication system.

If a first number n of communications is established, n setup messages SU are transmitted. However, to facilitate the understanding of the figure, the setup messages SU are represented by one arrow. Effectively, the setup message SU is repeated n times.

As a part of the setup message SU the mobile user equipment MUE informs the access network AN about a communication or communications that should be handed over.

The access network AN contains a device DPH, capable of deciding, whether an intersystem handover is necessary.

If the device DPH decides, that an intersystem handover is necessary, the procedure continues as described below.

The access network AN informs a core network CN that an intersystem handover is required by at least one handover request signal HRQ.

The core network CN contains an execution element EE for executing the handover.

The core network CN informs a base station controller BSC of a second access system, especially a Global System for Mobile Communication GSM, that it requires an intersystem handover by sending a handover request signal HRE to the base station controller BSC.

Afterwards the base station controller BSC sends a message for handover request acceptance HREA to the core network CN, for example to indicate that the resources for the requested communication or communications are available.

Within the first access system, especially a Universal Mobile Telecommunication System UMTS, a handover command HCM is sent to the access network AN of the first access system.

The access network AN transmits afterwards the handover command HCM to the mobile user equipment MUE. The mobile user equipment MUE sends a handover access HAC to the base station controller BSC.

The base station controller BSC sends afterwards a handover detect signal HDT to the core network CN.

After completing the intersystem handover the mobile user equipment MUE sends a handover complete signal HCP to the base station controller BSC.

The base station controller BSC sends the handover complete signal HCP to the core network CN.

The communication is released before a communication between a mobile user equipment MUE and a first access system of a communication system is disconnected.

If a first number n of communications has been established and a second, lower number m of communications is handed over, n-m communications have to be released.

For each communication which is not handed over a disconnect order DC, a release command RCM and a release complete signal RCP are sent. The disconnect order DC is sent from the core network CN to the mobile user equipment MUE. The mobile user equipment sends afterwards the release command RCM to the core network CN. The release complete signal RCP is sent from the core network CN to the mobile user equipment MUE.

Effectively, the release command RCM and the release complete signal RCP are repeated n-m times to release n-m communications. However, to facilitate the understanding of the figure, the release command RCM and the release complete signal RCP messages are represented by two arrows.

To clear the signalling connection to the first access network, the core network CN sends a clear command CCM to the access network AN. The access network AN signals afterwards a clear complete signal CCP to the core network.

Figure 8:
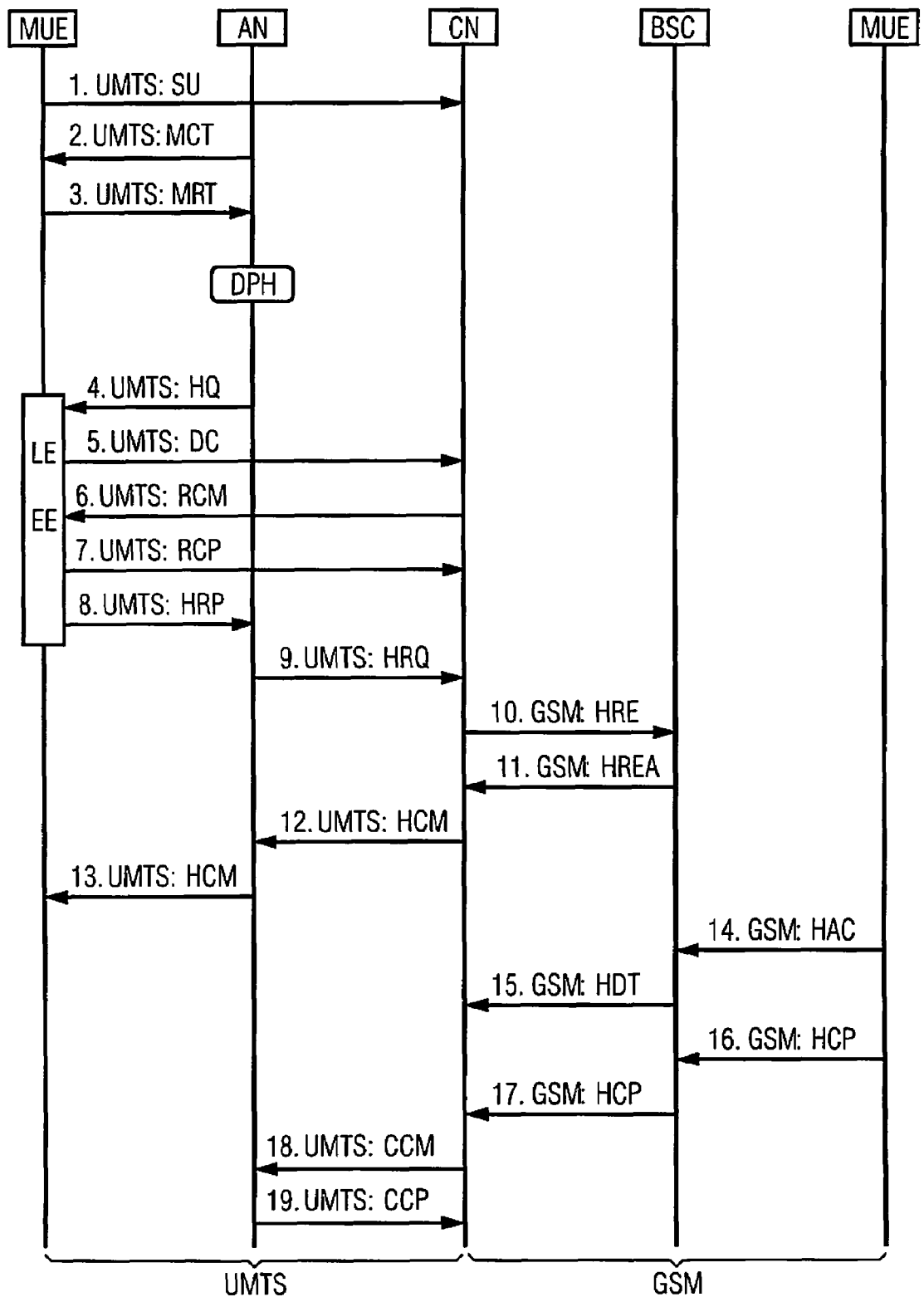
FIG. 8 shows sequences for an eighth implementation of an intersystem handover procedure according to the invention.

In the preferred embodiments of the invention which are described according to FIG. 8 a mobile user equipment MUE contains a logic element LE as well as an execution element EE for executing handover.

The communication is set up between the mobile user equipment MUE and a first access system, especially a Universal Mobile Telecommunication System UMTS, of the communication system.

If a first number n of communications is established, n setup messages SU are transmitted. However, to facilitate the understanding of the figure, the setup messages SU are represented by one arrow. Effectively, the setup message SU is repeated n times.

As a part of the setup message SU the mobile user equipment MUE informs the access network AN about a communication or communications that should be handed over.

It is evaluated with how many base stations of the first access system the mobile user equipment has contact. If the number is low, especially if the mobile user equipment is connected to only one base station of the first access system an access network AN of the first access system, especially a Universal Mobile Telecommunication System UMTS, commands the mobile user equipment MUE to perform measurements.

The type of measurements is adapted to physical parameters of the access systems. Examples of the measurements are: radio link measurements, intra-frequency measurements, Inter-frequency measurements, or traffic volume measurements.

A measurement report MRT is sent from the mobile user equipment MUE to the access network AN.

The access network AN contains a device DPH, capable of deciding, whether an intersystem handover is necessary and a logical element LE for deciding which communication or communications are handed over.

If the device DPH decides, that an intersystem handover is necessary, the procedure continues as described below.

An access network AN of the first access system sends a handover query HQ to a mobile user equipment MUE.

Afterwards the mobile user equipment sends a handover response HRP to the access network AN. The mobile user equipment MUE disconnects those communication or communications that cannot be kept. The mobile user equipment informs the core network CN which communication or communications should be kept. The access network informs a core network CN that an intersystem handover is required by at least one handover request signal HRQ.

The core network CN informs a base station controller BSC of the second access system, especially a Global System for Mobile Communication GSM, that it requires an intersystem handover by sending a handover request signal HRE to the base station controller BSC.

Afterwards the base station controller BSC sends a message for handover request acceptance HREA to the core network CN, for example to indicate that the resources for the requested communication or communications are available.

Within the first access system, especially a Universal Mobile Telecommunication System UMTS, a handover command HCM is sent to the access network AN of the first access system.

The access network AN transmits afterwards the handover command HCM to the mobile user equipment MUE. The mobile user equipment MUE sends a handover access HAC to the base station controller BSC.

The base station controller BSC sends afterwards a handover detect signal HDT to the core network CN.

After completing the intersystem handover the mobile user equipment MUE sends a handover complete HCP signal to the base station controller BSC.

The base station controller BSC sends the handover complete signal HCP to the core network CN.

The communication is released before a communication between a mobile user equipment MUE and a first access system of a communication system is disconnected.

If a first number n of communications has been established and a second, lower number m of communications is handed over, n-m communications have to be released.

For each communication which is not handed over a disconnect order DC, a release command RCM and a release complete signal RCP are sent. The disconnect order DC is sent from the core network CN to the mobile user equipment NUE. The mobile user equipment sends afterwards the release command RCM to the core network CN. The release complete signal RCP is sent from the core network CN to the mobile user equipment MUE.

Effectively, the release command RCM and the release complete signal RCP are repeated n-m times to release n-m communications. However, to facilitate the understanding of the figure, the release command RCM and the release complete signal RCP messages are represented by two arrows.

To clear the signalling connection to the first access network, the core network CN sends a clear command CCM to the access network AN. The access network AN sends afterwards a clear complete signal CCP to the core network.

Figure 9:
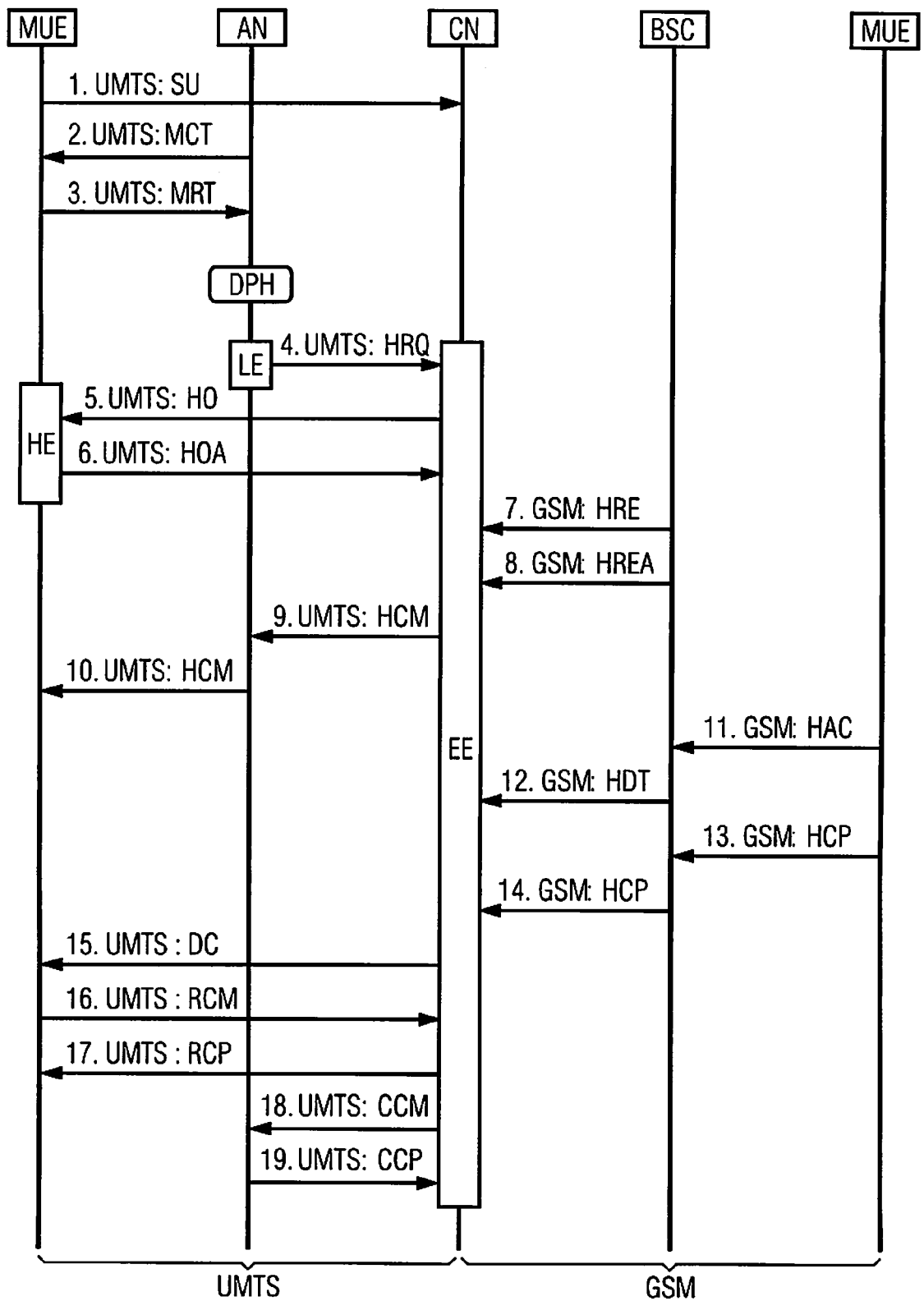
FIG. 9 shows sequences for a ninth implementation of an intersystem handover procedure according to the invention.

FIG. 9 shows an advantageous implementation of the invention.

The communication is set up between a mobile user equipment MUE and a first access system of a communication system.

Actual propositions for standards include at least one setup message for each communication. If a first number n of communications is established, n setup messages SU are transmitted. However, to facilitate the understanding of the figure, the setup messages SU are represented by one arrow. Effectively, the setup message SU is repeated n times.

Permanently or after certain time intervals the number of active links is checked. If this number is low, especially if only one link is found, measurements are performed.

Preferably, it is evaluated with how many base stations of the first access system the mobile user equipment has contact. If the number is low, especially if the mobile user equipment is connected to only one base station of the first access system an access network AN of the first access system, especially a Universal Mobile Telecommunication System UMTS, decides, whether an intersystem handover should be effected. By this decision that a handover is needed is carried out earlier.

The type of measurements is adapted to physical parameters of the access systems. Examples of the measurements are: radio link measurements, intra-frequency measurements, inter-frequency measurements, or traffic volume measurements.

A measurement report MRT is sent from the mobile user equipment MUE to the access network AN.

The access network AN contains a device DPH, capable of deciding, whether an intersystem handover is necessary and a logical element LE for deciding which communication or communications are to be handed over.

If the device DPH decides, that an intersystem handover is necessary, the procedure continues as described below.

The access network AN informs a core network CN that an intersystem handover is required by at least one handover request signal HRQ.

The core network CN contains an execution element EE for executing the handover.

The mobile user equipment contains means for keeping at least one call on hold. Preferably the means is a hold execution element HE.

The core network CN sends a hold order HO to the mobile user equipment MUE. The hold execution element HE puts the requested call on hold and sends a message for hold acceptance HOA to the core network. The sending of the hold order HO and the hold acceptance HOA in the mentioned directions is not part of any GSM standard. However, it is advangeous to inform the mobile user equipment about a communication or communications that are on hold.

With this implementation it is possible, to handover conference calls and/or to keep one or more communications on hold with the possibility of reactivating them at a later time.

The core network CN sends a message HRE to a base station controller BSC of the second access system, especially a Global System for Mobile Communication GSM, that it requests a handover. The signal is one step according to the sequence-diagram.

Afterwards the base station controller BSC sends a message for handover request acceptance HREA to the core network CN, for example to indicate that the resources for the requested communication or communications are available.

Within the first access system, especially a Universal Mobile Telecommunication System UMTS, a handover command HCM is sent to the access network AN of the first access system.

The access network AN transmits afterwards the handover command HCM to the mobile user equipment MUE. The mobile user equipment MUE sends a handover access HAC to the base station controller BSC.

The base station controller BSC sends afterwards a handover detect signal HDT to the core network CN.

After completing the intersystem handover the mobile user equipment MUE sends a handover complete HCP signal to the base station controller BSC.

The base station controller BSC sends the handover complete signal HCP to the core network CN.

The communication is released before a communication between a mobile user equipment MUE and a first access system of a communication system is disconnected.

If a first number n of communications has been established and a second, lower number m of communications is handed over, n-m communications have to be released.

For each communication which is not handed over a disconnect order DC, a release command RCM and a release complete signal RCP are sent. The disconnect order DC is sent from the core network CN to the mobile user equipment MUE. The mobile user equipment sends afterwards the release command RCM to the core network CN. The release complete signal RCP is sent from the core network CN to the mobile user equipment MUE.

Effectively, the release command RCM and the release complete signal RCP are repeated n-m times to release n-m communications. However, to facilitate the understanding of the figure, the release command RCM and the release complete signal RCP messages are represented by two arrows.

To clear the signalling connections to the first access network, the core network CN sends a clear command CCM to the access network AN. The access network AN signals afterwards a clear complete CCP signal to the core network.

Figure 10:
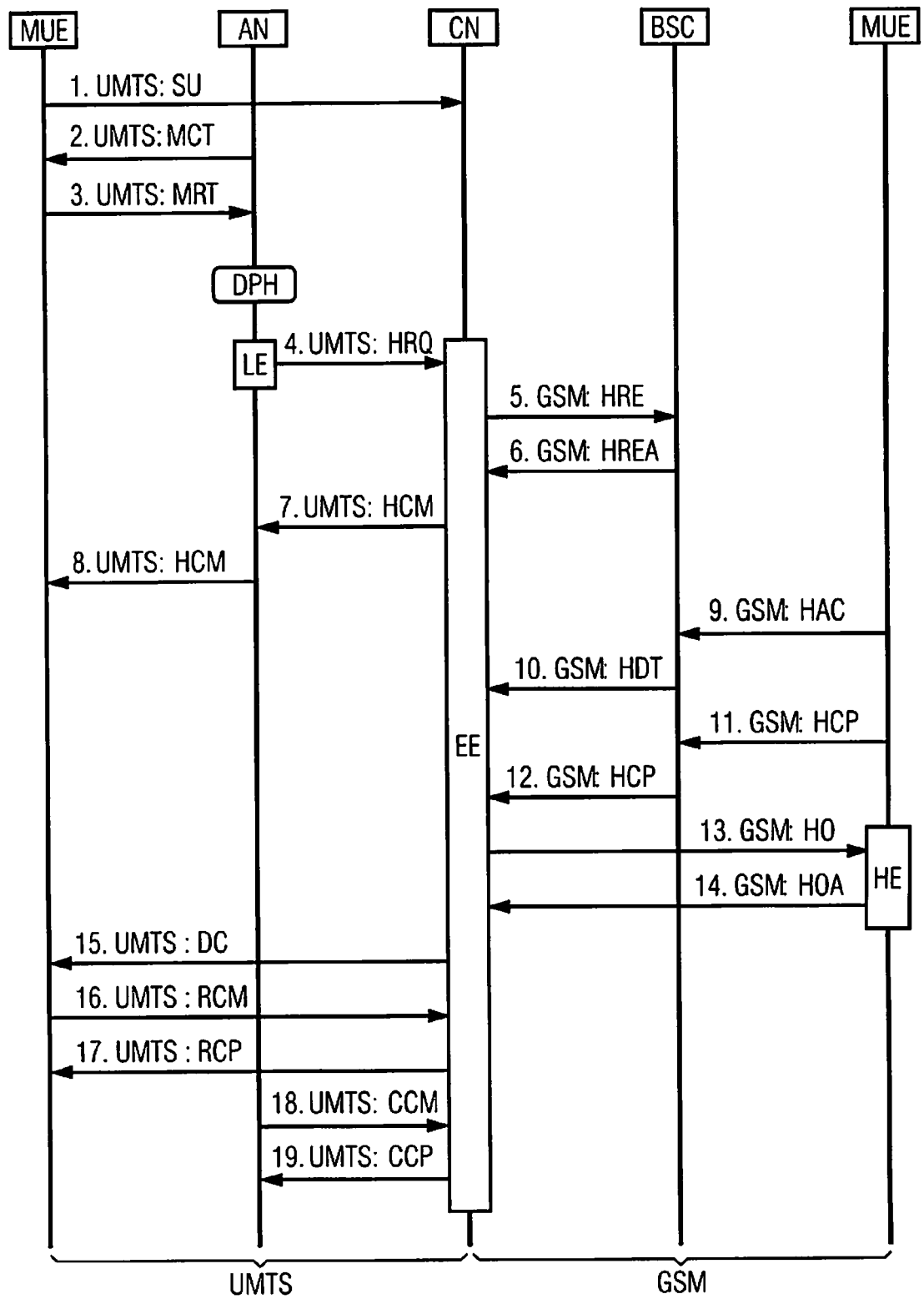
FIG. 10 shows sequences for a tenth implementation of an intersystem handover procedure according to the invention.

FIG. 10 shows an advantageous implementation of the invention.

The communication is set up between a mobile user equipment MUE and a first access system of a communication system.

Actual propositions for standards include at least one setup message for each communication. If a first number n of communications is established, n setup messages SU are transmitted. However, to facilitate the understanding of the figure, the setup messages SU are represented by one arrow. Effectively, the setup message SU is repeated n times.

Permanently or after certain time intervals the number of active links is checked. If this number is low, especially if only one link is found, measurements are performed.

Preferably, it is evaluated with how many base stations of the first access system the mobile user equipment has contact. If the number is low, especially if the mobile user equipment is connected to only one base station of the first access system an access network AN of the first access system, especially a Universal Mobile Telecommunication System UMTS, decides, whether an intersystem handover should be effected. By this decision that a handover is needed is carried out earlier.

The type of measurements is adapted to physical parameters of the access systems. Examples of the measurements are: radio link measurements, intra-frequency measurements, inter-frequency measurements, or traffic volume measurements.

A measurement report MRT is sent from the mobile user equipment MUE to the access network AN.

The access network AN contains a device DPH, capable of deciding, whether an intersystem handover is necessary and a logical element LE for deciding which communication or communications are to be handed over.

If the device DPH decides, that an intersystem handover is necessary, the procedure continues as described below.

The access network AN informs a core network CN that an intersystem handover is required by at least one handover request signal HRQ.

The core network CN contains an execution element EE for executing the handover.

The core network CN sends a message HRE to a base station controller BSC of the second access system, especially a Global System for Mobile Communication GSM, that it requests a handover. The signal is one step according to the sequence-diagram.

Afterwards the base station controller BSC sends a message for handover request acceptance HREA to the core network CN, for example to indicate that the resources for the requested communication or communications are available.

Within the first access system, especially a Universal Mobile Telecommunication System UMTS, a handover command HCM is sent to the access network AN of the first access system.

The access network AN transmits afterwards the handover command HCM to the mobile user equipment MUE. The mobile user equipment MUE sends a handover access HAC to the base station controller BSC.

The base station controller BSC sends afterwards a handover detect signal HDT to the core network CN.

After completing the intersystem handover the mobile user equipment MUE sends a handover complete HCP signal to the base station controller BSC.

The base station controller BSC sends the handover complete signal HCP to the core network CN.

The mobile user equipment contains means for keeping at least one call on hold. Preferably the means is a hold execution element HE.

The core network CN sends a hold order HO to the mobile user equipment MUE. The hold execution element HE puts the requested call on hold and sends a message for hold acceptance HOA to the core network. The sending of the hold order HO and the hold acceptance HOA in the mentioned directions is not part of any GSM standard. However, it is advantageous to inform the mobile user equipment about a communication or communications that are on hold.

With this implementation it is possible, to handover conference calls and/or to keep one or more communications on hold with the possibility of reactivating them at a later time.

The communication is released before a communication between a mobile user equipment MUE and a first access system of a communication system is disconnected.

If a first number n of communications has been established and a second, lower number m of communications, including both active and held communications, is handed over, n-m communications have to be released.

For each communication which is not handed over a disconnect order DC, a release command RCM and a release complete signal RCP are sent. The disconnect order DC is sent from the core network CN to the mobile user equipment MUE. The mobile user equipment sends afterwards the release command RCM to the core network CN. The release complete signal RCP is sent from the core network CN to the mobile user equipment MUE.

Effectively, the release command RCM and the release complete signal RCP are repeated n-m times to release n-m communications. However, to facilitate the understanding of the figure, the release command RCM and the release complete signal RCP messages are represented by two arrows.

To clear the signalling connections to the first access network, the core network CN sends a clear command CCM to the access network AN. The access network AN signals afterwards a clear complete CCP signal to the core network.

Figure 11:
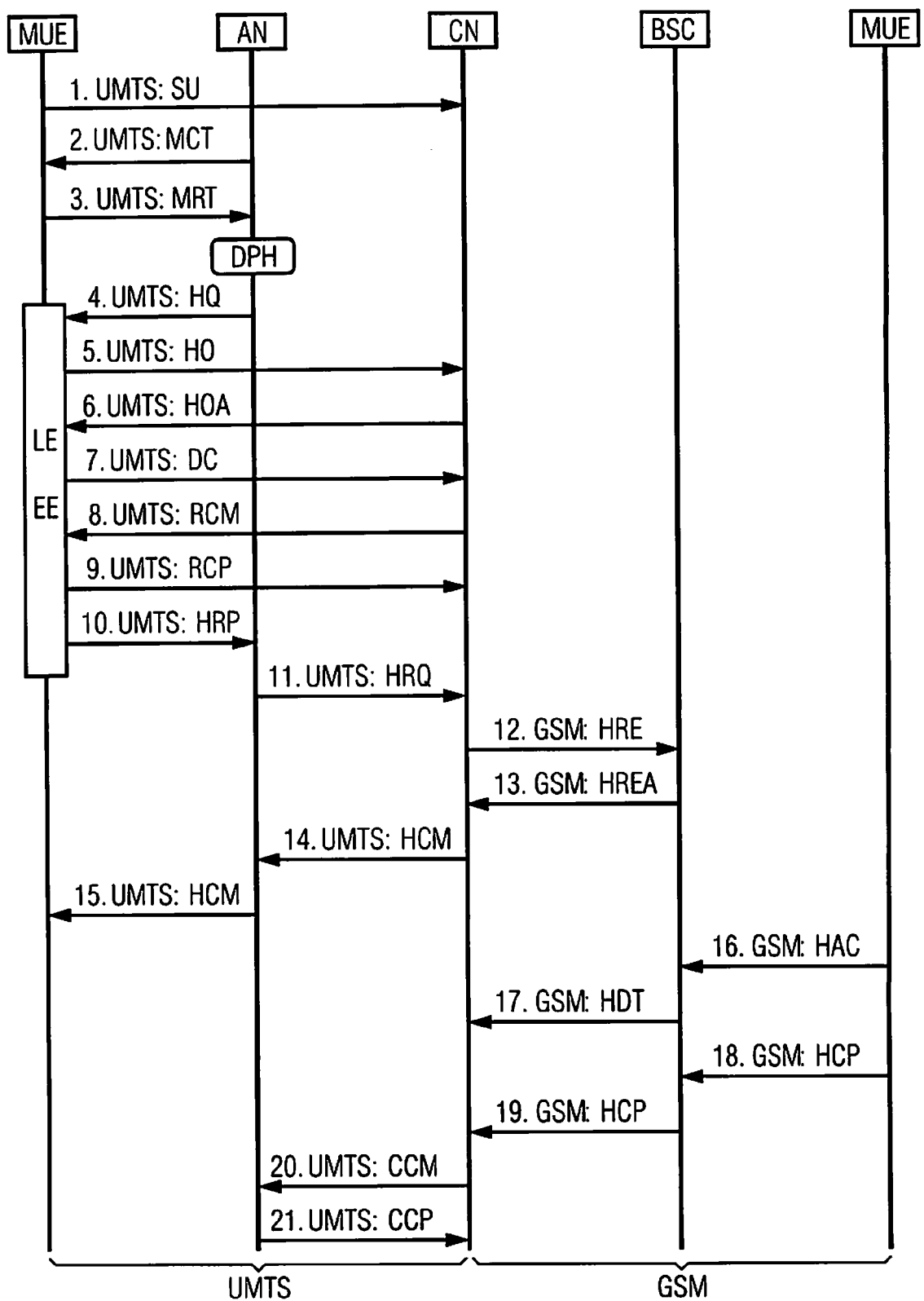
FIG. 11 shows sequences for an eleventh implementation of an intersystem handover procedure according to the invention.

In the preferred embodiments of the invention which are described according to FIG. 11 a mobile user equipment MUE contains a logic element LE as well as an execution element EE for executing handover.

The communication is set up between the mobile user equipment MUE and a first access system, especially a Universal Mobile Telecommunication System UMTS, of the communication system.

If a first number n of communications is established, n setup messages SU are transmitted. However, to facilitate the understanding of the figure, the setup messages SU are represented by one arrow. Effectively, the setup message SU is repeated n times.

As a part of the setup message SU the mobile user equipment MUE informs the access network AN about a communication or communications that should be handed over.

It is evaluated with how many base stations of the first access system the mobile user equipment has contact. If the number is low, especially if the mobile user equipment is connected to only one base station of the first access system an access network AN of the first access system, especially a Universal Mobile Telecommunication System UMTS, commands the mobile user equipment MUE to perform measurements.

The type of measurements is adapted to physical parameters of the access systems. Examples of the measurements are: radio link measurements, intra-frequency measurements, Inter-frequency measurements, or traffic volume measurements.

A measurement report MRT is sent from the mobile user equipment MUE to the access network AN.

The access network AN contains a device DPH, capable of deciding, whether an intersystem handover is necessary and a logical element LE for deciding which communication or communications are handed over.

If the device DPH decides, that an intersystem handover is necessary, the procedure continues as described below.

An access network AN of the first access system sends a handover query HQ to a mobile user equipment MUE.

Afterwards the mobile user equipment sends a handover response HRP to the access network AN. The access network informs a core network CN that an intersystem handover is required by at least one handover request signal HRQ.

The mobile user equipment contains means for keeping at least one call on hold. Preferably the means is a hold execution element HE.

The mobile user equipment MUE sends a hold order HO to the core network CN. The hold execution element HE puts the requested call on hold and sends a message for hold acceptance HOA to the mobile user equipment MUE.

With this implementation it is possible, to handover conference calls and/or to keep one or more communications on hold with the possibility of reactivating them at a later time.

The core network CN informs a base station controller BSC of the second access system, especially a Global System for Mobile Communication GSM, that it requires an intersystem handover by sending a handover request signal HRE to the base station controller BSC.

Afterwards the base station controller BSC sends a message for handover request acceptance HREA to the core network CN, for example to indicate that the resources for the requested communication or communications are available.

Within the first access system, especially a Universal Mobile Telecommunication System UMTS, a handover command HCM is sent to the access network AN of the first access system.

The access network AN transmits afterwards the handover command HCM to the mobile user equipment MUE. The mobile user equipment MUE sends a handover access HAC to the base station controller BSC.

The base station controller BSC sends afterwards a handover detect signal HDT to the core network CN.

After completing the intersystem handover the mobile user equipment MUE sends a handover complete HCP signal to the base station controller BSC.

The base station controller BSC sends the handover complete signal HCP to the core network CN.

The communication is released before a communication between a mobile user equipment MUE and a first access system of a communication system is disconnected.

If a first number n of communications has been established and a second, lower number m of communications is handed over, n-m communications have to be released.

For each communication which is not handed over a disconnect order DC, a release command RCM and a release complete signal RCP are sent. The disconnect order DC is sent from the core network CN to the mobile user equipment MUE. The mobile user equipment sends afterwards the release command RCM to the core network CN. The release complete signal RCP is sent from the core network CN to the mobile user equipment MUE.

Effectively, the release command RCM and the release complete signal RCP are repeated n-m times to release n-m communications. However, to facilitate the understanding of the figure, the release command RCM and the release complete signal RCP messages are represented by two arrows.

To clear the signalling connection to the first access network, the core network CN sends a clear command CCM to the access network AN. The access network AN sends afterwards a clear complete signal CCP to the core network.

A disconnect, a release or a release complete message need not to be sent just after the handover complete message. However, this has the advantage that the resources in the core network are released earlier.

What is claimed is:

1. A communication system including a mobile user equipment, a first access system, a second access system, and a core network, the communication system comprising:
    means for establishing a number of communication links between said mobile user equipment and said core network wherein each communication link is established by communicating a setup message between the mobile user equipment and the core network over the first access system;
    wherein said first access system is adapted to handle a larger number of simultaneous communication links with said mobile user equipment than said second access system;
    means for evaluating if a handover between the first access system and the second access system should be effectuated;
    means for selecting, if the handover is necessary, which one of said communication links is handed over and at least one communication link which is not handed over;
    means for executing the handover of the communication link selected for the handover; and
    means for releasing the at least one communication link which is not handed over.

2. The apparatus of claim 1, wherein
    said first access system includes a Universal Mobile Telecommunications System (UMTS) wherein the UMTS handles a number of communication links simultaneously between the mobile user equipment and the core network; and
    said second access system includes a Global System for a Mobile Communication System (GSM), wherein the GSM system handles a lesser number of communication link, than the UMTS, simultaneously between the mobile user equipment and the GSM network.

3. The apparatus of claim 1, wherein the core network is for transferring information to and from other communication systems, the other communication systems including a fixed network such as an Integrated Service Digital Network (ISDN) and a Public Switched Telephone Network (PSTN) or a further mobile network.

4. The apparatus of claim 1, wherein the mobile user equipment is one of a mobile computer, a mobile telephone or a mobile multimedia system.

5. The apparatus of claim 1, wherein a device for deciding whether an intersystem handover is necessary is located in one or all of the access networks and the core network.

6. The apparatus of claim 1, further comprising means for signaling a potential intersystem handover to the mobile user equipment enabling the mobile user to avoid the potential intersystem handover.

7. The apparatus of claim 6, further comprising:
    means for disconnecting all connections which cannot be utilized in the second access system, and
    means for determining which communication link should be handed over to the second access system.

8. The apparatus of claim 1, the apparatus further including means for deciding, according to at least one presetting, which communications link is to be handed over, said presetting being stored in one or more of the mobile user equipment, the core network or the access networks.

9. The apparatus of claim 8, wherein the at least one presetting is identical for every mobile user or different for every mobile user.

10. The apparatus of claim 8, wherein the at least one presetting is different for different categories of communication types.

11. The apparatus of claim 8, wherein the at least one presetting is different for different priorities of categories of communication types.

12. The apparatus of claim 8, further comprising, the means for deciding being located in one or all of the access networks and the core network.

13. The method of claim 12, further comprising means for signaling a potential intersystem handover to the mobile user equipment thus enabling the mobile user opportunity to avoid the potential intersystem handover.

14. In a communication system including a mobile user equipment, a first access system, a second access system, and a core network, a method comprising the steps of:
    establishing a number of communication links between said mobile user equipment and said core network wherein each communication link is established by communicating a setup message between the mobile user equipment and the core network over a first access system;
    wherein said first access system is adapted to handle a larger number of simultaneous communication links with said mobile user equipment than said second access system;
    evaluating if a handover between the first access system and the second access system should be effectuated;
    selecting, if the handover is necessary, which one of said communication links is handed over and at least one communication link which is not handed over;
    executing the handover of the communication link selected for the handover; and
    releasing the at least one communication link which is not handed over.

15. The method of claim 14, wherein
    said first access system includes a Universal Mobile Telecommunications System (UMTS) wherein the UMTS handles a number of communication links simultaneously between the mobile user equipment and the core network; and
    said second access system includes a Global System for a Mobile Communication System (GSM), wherein the GSM system handles a lesser number of communication links, than the UMTS, simultaneously between the mobile user equipment and the GSM network.

16. The method of claim 14, further comprising the step of the core network transferring information to and from other communication systems, the other communication systems including a fixed network such as an Integrated Service Digital Network (ISDN) and a Public Switched Telephone Network (PSTN) or a further mobile network.

17. The method of claim 14, wherein the mobile user equipment is one of a mobile computer, a mobile telephone or a mobile multimedia system.

18. The method of claim 14, the step of utilizing a device or function for deciding whether an intersystem handover is necessary, the device being located in one or all of the access networks and the core network.

19. The method of claim 14, further comprising the step of signaling a potential intersystem handover to the mobile user equipment for enabling the mobile user to avoid the potential intersystem handover.

20. The method of claim 19, further comprising the step of the mobile user equipment determining whether to disconnect all communication links which cannot be kept in the second access system.

21. The method of claim 14, further comprising the step of deciding, according to at least one presetting, whether a communications link is to be handed over, said presetting being stored in one or more of the mobile user equipment, the core network or the access networks.

22. The method of claim 21, wherein the at least one presetting is identical for every mobile user or different for every mobile user.

23. The method of claim 21, wherein the at least one presetting is different for different categories of communication links.

24. The method of claim 21, wherein the at least one presetting is different for different priorities of categories of communication links.

* * * * *

UNITED STATES PATENT AND TRADEMARK OFFICE
CERTIFICATE OF CORRECTION

| | | |
|---|---|---|
| PATENT NO. | : 7,630,715 B2 | Page 1 of 1 |
| APPLICATION NO. | : 12/186816 | |
| DATED | : December 8, 2009 | |
| INVENTOR(S) | : Sharp et al. | |

It is certified that error appears in the above-identified patent and that said Letters Patent is hereby corrected as shown below:

In Column 2, Line 67, before "one access" insert -- at least --.

In Column 6, Line 9, delete "(NUE)" and insert -- (MUE) --, therefor.

In Column 18, Line 35, delete "NUE." and insert -- MUE. --, therefor.

Signed and Sealed this

Second Day of March, 2010

David J. Kappos
*Director of the United States Patent and Trademark Office*